United States Patent [19]
Miida et al.

[11] Patent Number: 4,926,205
[45] Date of Patent: May 15, 1990

[54] PHASE-DIFFERENCE DETECTOR

[75] Inventors: Takashi Miida; Jin Murayama, both of Kanagawa, Japan

[73] Assignee: Fuji Photo Film Co., Kanagawa, Japan

[21] Appl. No.: 321,379

[22] Filed: Mar. 10, 1989

[30] Foreign Application Priority Data

Mar. 10, 1988 [JP] Japan .................................. 63-54790

[51] Int. Cl.$^5$ .............................................. G03B 3/12
[52] U.S. Cl. .................... 354/402; 354/408; 250/201.2
[58] Field of Search ............... 354/403, 408, 406, 407; 358/909; 356/4; 250/201

[56] References Cited

U.S. PATENT DOCUMENTS

4,849,619 7/1989 Miida et al. .......................... 354/408

Primary Examiner—L. T. Hix
Assistant Examiner—David M. Gray

[57] ABSTRACT

A phase-difference detector for use with an auto-focus detecting apparatus of camera. The detector comprises a means for creating correlative values which exhibit outstanding characteristics that makes it possible to ascertain the maximum and minimum values. The detector is capable of detecting a phase-difference with high accuracy.

6 Claims, 9 Drawing Sheets

PHASE-DIFFERENCE DETECTOR

BACKGROUND OF THE PRESENT INVENTION

The present invention is directed to a phase-difference detector for use with an auto-focus detecting apparatus of a camera.

A conventional auto-focus detecting apparatus utilizes a phase detector which correlates an arithmetic operation based upon signals outputted from pixels of a linear imaging device. This conventional auto-focus detecting apparatus is illustrated by FIG. 10 and will be described below.

Figure 10:
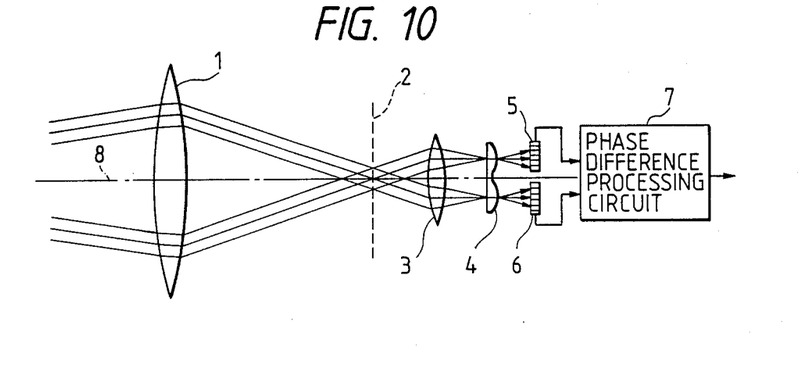
FIG. 10 is a block diagram schematically showing a conventional auto-focus detecting apparatus.

As shown in FIG. 10, disposed behind a film-like surface 2 provided in rear of an imaging lens 1 are a condenser lens 3, a separator lens 4, and a phase-difference detector, respectively. The phase-difference detector comprises linear imaging devices 5 and 6 for optically receiving and photoelectrically converting a pair of images corresponding to a subject to be photographed. The images are formed by the separator lens 4. The phase-difference detector further comprises a processing circuit 7 for determining the focalization state of the images. This focalization state is determined with respect to electric signals generated by respective pixels in devices 5 and 6. These electric signals represent a distribution of luminous intensities.

Rays of light representing the images formed on the linear imaging devices 5 and 6 approach an optical axis 8 in a front defocus state where the image of the subject is positioned in front of film-like surface 2. However, in a rear defocus state, the rays of light which form the images move away from the optical axis 8. A predetermined position between the front and rear defocus states can be attained when the focalization state is determined. Hence, the processing circuit 7 functions to determine the focalization state by detecting the position where the rays of light are closer to the optical axis 8 on the basis of the electric signals generated by the imaging devices 5 and 6.

The detection of the relative positions of the images formed on linear imaging devices 5 and 6 involves the use of a phase-difference detecting method. Based on this method, correlative values of a pair of images formed on the linear imaging devices 5 and 6 are obtained by the arithmetic operation utilizing the following formula, $$H(L) = \sum_{k=1}^{n} |B(K) - R(K - L - 1)| \quad (1)$$

where L is the integral variable, e.g., 1 to 9, corresponding to an amount of relative movement of the focusing lenses.

The focalization state is determined according to the amount of relative movement (phase-difference) of the focusing lenses till the computed correlative value realizes a minimum value (or a maximum value).

Figure 11A:
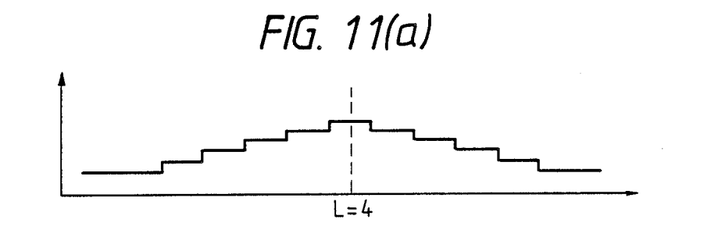
FIG. 11 is a diagram showing the principle of a conventional phase-difference detector.
Figure 11B:
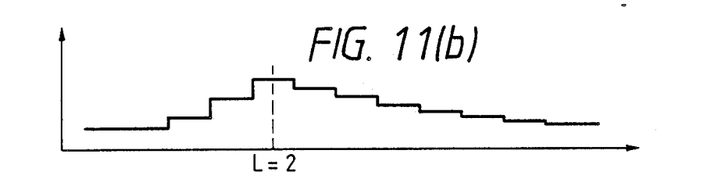
Figure 11C:
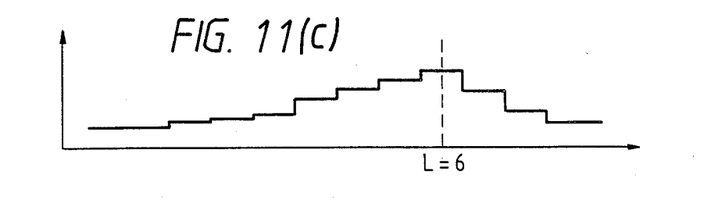

The symbol B(K) represents a signal outputted in time-series from each pixel of one linear imaging device 5, while R(K-L-1) designates a signal outputted in time-series from each pixel of another linear imaging device 6. Correlative values H(1), H(2), ..., H(9) are obtained by performing the arithmetic operation utilizing formula (1) every time the movement quantity L is varied from 1 to 9. For instance, as illustrated in FIG. 11, assuming that the focalization state is previously arranged to be preset when the correlative value H(4) is the minimum as shown in FIG. 11(a), and if the correlative value is at a minimum in such a position other than H(4), such as shown in FIGS. 11(b) and 11(c), the amount of deviation, i.e., a phase-difference when L=4, is detected as an amount of defocus.

In the above-mentioned conventional phase-difference detector, the correlation arithmetic operation is carried out with respect to the electric signals outputted from the respective pixels of the linear imaging devices. If the amplitude of the electric signal per pixel varies slightly, variations in individual correlative values H(1), H(2), ..., H(L) become slight, resulting in that distinguishable features cannot be detected between the values. Namely, when the variations in respective correlative values are small, the maximum or minimum value cannot readily be ascertained in some cases. As a result, it is impossible to accurately detect the phase-difference from the focalization state.

SUMMARY OF THE PRESENT INVENTION

Accordingly, it is a primary objective of the present invention to provide a phase-difference detector comprising a means for creating correlative values which exhibit outstanding characteristics that makes it possible to ascertain the maximum or minimum values.

To accomplish this objective, a phase-difference detector, according to the present invention comprises: sensor means for non-destructively reading electric signals associated with a pair of images corresponding to a subject to be photographed which are generated by respective pixels in imaging devices; analog correlation arithmetic means for performing analog correlation arithmetic operations to obtain correlative values of the arithmetic signals outputted from the sensor means; and optimum control means for permitting the analog correlation arithmetic means to reperform the arithmetic operation by changing an amplification factor of the arithmetic signal if no distinguishable feature appears in the correlative values computed by the correlation arithmetic means.

The phase-difference detector, according to the present invention, is capable of detecting a phase-difference with high accuracy. When the present invention does not acquire a correlative value exhibiting outstanding features with respect to amplitude-variations in the arithmetic signals corresponding to a pair of images corresponding to a subject to be photographed which are outputted from the imaging devices, the correlative values of the arithmetic signals which indicate distinguishable variations in amplitude are computed by changing the amplification factor of the arithmetic signals thereby obtaining correlative values having the distinguishable characteristics.

BRIEF DESCRIPTION OF THE DRAWINGS

This and other objectives and features of the present invention will become apparent from the following description taken in conjunction with a preferred embodiment of the present invention with reference to the accompanying drawings, wherein.

DETAILED DESCRIPTION OF THE PRESENT INVENTION

One embodiment of a phase-difference detector according to the present invention, will be described below with reference to the accompanying drawings.

Figure 1:
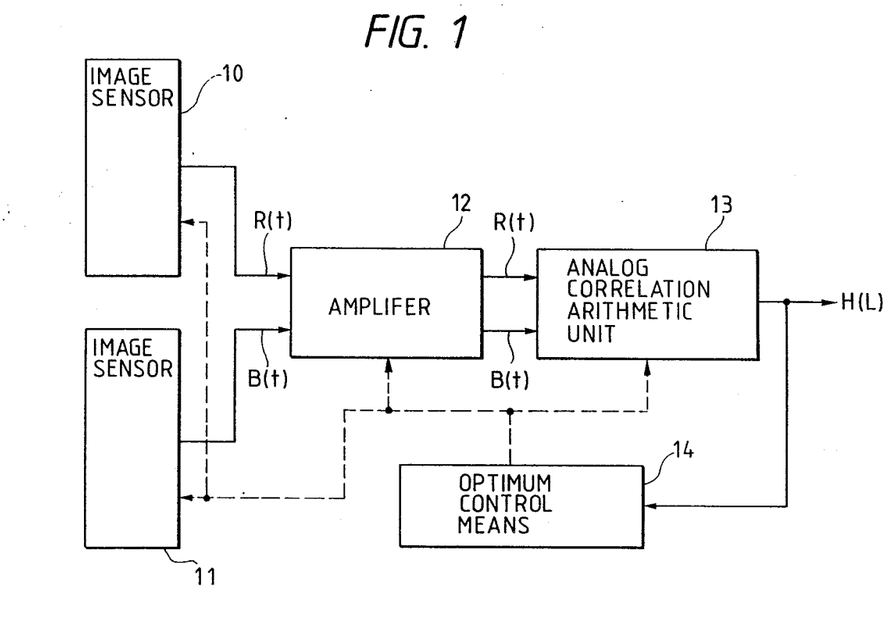
FIG. 1 is a block diagram illustrating a block diagram of one embodiment of a phase-difference detector according to the present invention.

FIG. 1 represents a phase-difference detector according to the present invention. Reference numerals 10 and 11 designate image sensors. Reference 12 denotes a variable amplifier for amplifying, at a variable amplification factor, analog signals, R(t) and B(t). The signals R(t) and B(t) corresponds to patterns of images corresponding to a subject to be photographed which are outputted from image sensors 10 and 11. Reference 13 represents an analog correlation arithmetic unit for computing correlative values using formula (1) described above, using the arithmetic signals (amplified signals are marked with R'(t) and B'(t)) amplified by variable amplifier 12. Reference 14 represents optimum control means for causing the variable amplifier 12 or analog correlation arithmetic unit 13 to reperform an arithmetic operation by varying the amplification factor of the arithmetic signals R'(t) and B'(t) when no distinguishable change appears between each level of the correlative values H(L) outputted from analog correlation arithmetic unit 13. The detector further comprises, though not illustrated, an A/D converter for converting the correlative values H(L) outputted as analog values into digital values and control signal generating means for generating specific timing control signals for controlling the operations of the above-described element of the phase-difference detector. The components described above are formed as an integral module on one chip by, e.g., a C-MOS manufacturing process based on the semiconductor integrated circuit technology.

Figure 2:
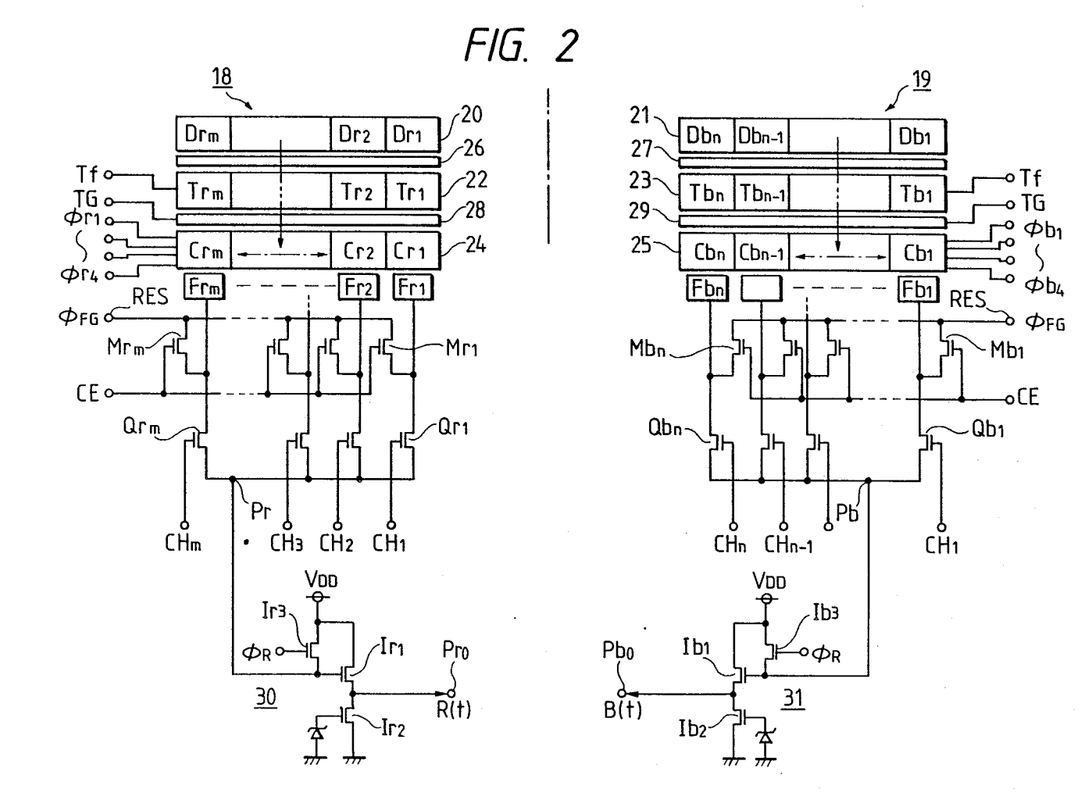
FIG. 2 is a block diagram showing an image sensor depicted in FIG. 1.

The respective elements of the phase-difference detectors will now be discussed in greater detail. The image sensors 10 and 11 will be explained with reference to FIG. 2. In FIG. 2, reference 18 represents a reference image sensor corresponding to image sensor 10, while 19 denotes a basic image sensor corresponding to image sensor 11. Each basic image sensors 18 and 19 has the same cell-construction. This cell-construction is represented by: light receiving units 20 and 21 which include photoelectric conversion elements Dr1 to Drm and Db1 to Dbn, respectively, each serving as a pixel; accumulation units 22 and 23 which consist of CCDs provided for accumulation signal electric charges generated in light receiving units 20 and 21; and shift register units 24 and 25 formed next to the CCDs for serially transferring the electric charges after taking in the signal electric charges transferred by accumulation units 22 and 23.

More specifically, accumulation units 22 and 23 and shift register units 24 and 25 include electric charge transfer elements Tr1 to Trm, Tb1 to Tbn, Cr1 to Crm, and Cb1 to Cbn, respectively, which correspond to photoelectric conversion elements Dr1 to Drm and Db1 to Dbn. Accumulation units 22 and 23 parallelly transfer the signal electric charges to shift register units 24 and 25, and shift register unit 25 in turn serially transfers the signal electric charges. Note that, as will be mentioned below, shift register unit 25 on the side of the basic image sensor, unlike shift register unit 24, does not serially transfer the signal electric charges.

The numerals 26 and 27 represent conductive layers formed on a surface of a channel unit for moving the signal electric charge from light receiving units 20 and 21 to accumulation units 22 and 23. The conductive layers are each composed of a polysilicon layer and constitute a potential barrier having a given level.

The numerals 28 and 29 denote transfer gates for controlling the movement of the signal electric charges between the accumulation in units and the shift register units.

Formed contiguously to the respective electric charge transfer elements Cr1 to Crm and Cb1 to Cbn are floating gates Fr1 to Frm and Fb1 to Fbn which are in turn connected to a reset terminal RES through MOS type FETs Mr1 to Mrm and Mb1 to Mbn. The gates of the MOS type FETs Mr1 to Mrm and Mb1 to Mbn are supplied with control signals CE. The floating gates are further connected to common nodes FR and Pb through MOS type FETs Qr1 to Qrm and Qb1 to Qbn, respectively. The gates of the MOS type FETs Qr1 to Qrm and Qb1 to Qbn are connected to channel change-over signals CH1 to CHm, thereby performing a multiplex operation. Common contacts Pr0 and Pb0 are connected via impedance conversion circuits 30 and 31 to nodes Pr and Pb, respectively.

Impedance conversion circuits 30 and 31 each have the same circuit configuration which includes: MOS type FETs Ir1, Ir2, Ib1, and Ib2, the drain-source paths of which are connected in series between a power supply $V_{DD}$ and an earth terminal; and MOS type FETs Ir3 and Ib3 which are connected in parallel between the gates and sources of MOS type FETs Ir1 and Ib1. The arrangement is such that immediately after a refresh signal R is applied to Ir3 and Ib3, common contacts Pr0 and Pb0 are clamped onto a power supply $V_{DD}$. The gates of MOS type FETs Ir2 and Ib2 are biased with a predetermined voltage.

The positional relation between shift register units 24 and 25 and floating gates Fr1 to Frm and Fb1 to Fbn will be described in conjunction with FIG. 3.

Light receiving unit 20 of reference image sensor 18 is formed of 48 pieces of photoelectric conversion elements disposed at a pitch width W. Accumulation unit 22 and shift register unit 24 of light receiving unit 20 are each formed of 48 pieces of electric charge transfer elements disposed at the same pitch width W. Floating gates Fr1 to Fr40 are provided contiguously to 40 pieces of the electric charge transfer elements, which are combined to form a third block $III_R$, which excludes first and second blocks $I_R$ and $II_R$ each consisting of 4 pieces of elements on both sides of block $III_R$. The floating gates are sectioned into a fourth block $IV_R$ consisting of 32 pieces of floating gates Fr1 to Fr32 and a fifth block $V_R$ consisting of the remaining gates. Shift register unit 24 is designed so that additional electric charge transfer elements, which are combined to form an additional unit $VI_R$, are fitted to the first block $I_R$, and a sum of the electric charge transfer elements of the first block $I_R$ and of the additional unit $VI_R$ is equal to or greater than the number L of correlation arithmetic operations in the formula (1). One end of floating gates Fr1 to Fr40 is connected to a reset terminal RES through MOS type FETs Mr1, Mr2, ... which are shown in FIG. 2. Floating gates Fr1 to Fr32 are connected to node Pr through MOS type FETs Qr1 to Qrm as depicted in FIG. 2. Namely, FIG. 2 illustrates the third and fourth blocks $III_R$ and $IV_R$ of FIG. 3 and the other blocks $I_R$, $II_R$, $V_R$ and $VI_R$ are omitted from FIG. 2. These blocks serve as preparation electric charges. Even when serially transferring the signal electric charges of region $III_R$ to the right-hand of the Figure for the execution of the correlation arithmetic operation which will be discussed below, shift register unit 24 shifts the signal electric charges to regions $I_R$ and $VI_R$ and holds them.

On the other hand, light receiving unit 21 of the basic image sensor 19 is formed of 40 pieces of photoelectric conversion elements disposed at the same pitch width W (as that in reference image sensor 18). The accumulation unit 23 and also shift register unit 25 of this light receiving unit are each formed of 40 pieces of electric charge transfer elements disposed at the pitch width W. Provided contiguously to electric charge transfer elements Cb1 to Cb32, which are combined to constitute a third block $III_B$ exclusive of first and second blocks $I_B$ and $II_B$ each consisting of 4 pieces of elements disposed on both sides, are floating gates Fb1 to Fb32. One end of the floating gates is connected respectively to MOS type FETs Mb1 to Mbn and Qb1 to Qbn of FIG. 2. FIG. 2 illustrates the third block $III_B$ extracted from FIG. 3.

Light receiving unit 20 is spaced at a distance $L_1$ away from the optical axis, while light receiving unit 21 is spaced at a distance $L_2$ away from the optical axis. The distance $L_2$ ($L_1+4W$) being obtained by adding 4 pitch widths (4W) to distance $L_1$.

Figure 4:
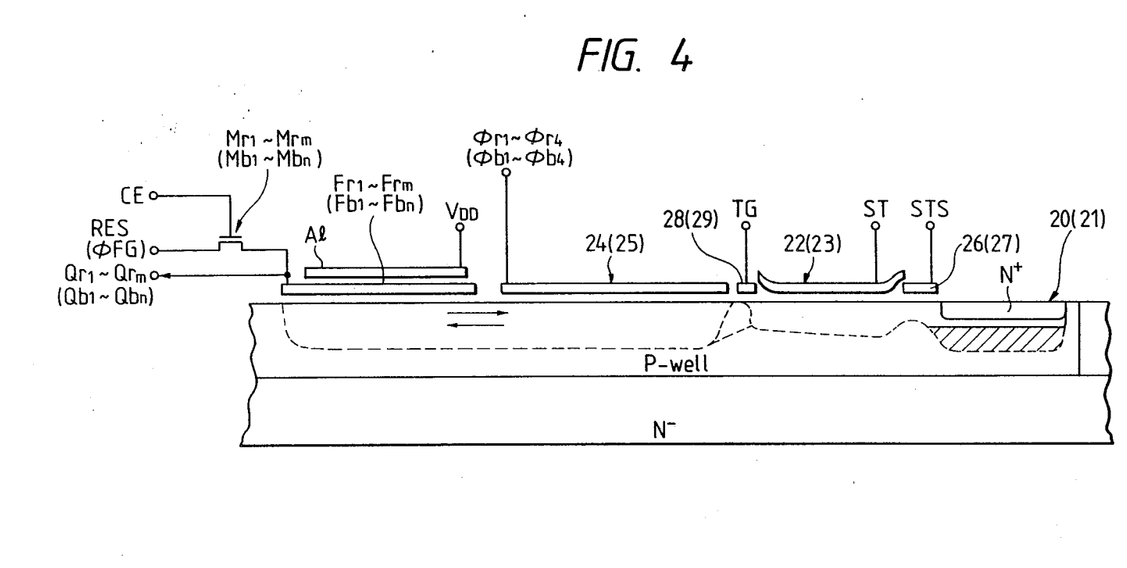
FIG. 4 is a sectional view illustrating a configuration of a section of the image sensor depicted in FIG. 2.

The image sensor, analog correlation arithmetic unit, and A/D converter are formed as an integral module as a semiconductor integrated circuit device on a single chip. The configuration of this type of semiconductor integrated circuit device will be described with reference to FIG. 4. FIG. 4 is a sectional view schematically illustrating a set of components ranging from light receiving units 20 and 21 to floating gates Fr1 to Frm (Fb1 to Fbn).

Referring again to FIG. 4, a plurality of N+type layers are formed on some parts of a P-type diffused layer (p-well) which is in turn formed on the surface of an N-type semiconductor substrate, thus constituting groups of photoelectric conversion elements of light receiving units 20 and 23.

Formed contiguously through an $SiO_2$ layer (not illustrated) on the semiconductor substrate are transfer gate electrode layers which constitute the individual electric charge transfer elements of signal barrier units 26 and 27, accumulation units 22 and 23, gate electrode layers which constitute transfer gates 28 and 29, and transfer gate electrode layers which constitute the individual electric charge transfer elements of shift register 24 and 25. A polysilicon layer is laminated adjacent to shift register units 24 and 25. The polysilicon layer forms floating gates Fr1 to Frm and Fb1 to Fbn and an electrode layer Al clamped on the power supply $V_{DD}$. The electrode layer Al is formed to cover the entire upper surface of the plurality of floating gates Fr1 to Frm and Fb1 to Fbn. One end of the floating gates is connected to MOS type FETs Mr1 to Mrm and Mb1 to Mbn.

A reset signal $\epsilon_{FG}$ which applied to reset terminal RES is equal in electric potential to power supply $V_{DD}$. Subsequently floating gates Fr1 to Frm and Fb1 to Fbn are clamped onto the power supply $V_{DD}$ through MOS type FETs Mr1 to Mrm and Mb1 to Mbn by control signals CE each having an "H" level. Thereafter, MOS type FETs Mr1 to Mrm and Mb1 to Mbn are returned to the off state, thereby forming, as indicated by a dotted line in FIG. 4, a deep potential-well in the semiconductor substrate. Then, the signal electric charges of shift register units 24 and 25 flow into the regions formed downwardly from the floating gates. Voltage-variations are caused in respective floating gates Fr1 to Frm (Fb1 to Fbn). These voltage-variations correspond to the quantities of individual signal electric charges flowing into such regions, thereby detecting patterns of the images formed on light receiving units 20 and 21 as voltage signals.

On the other hand, after setting the reset terminal RES at an earth potential, MOS type FETs Mr1 to Mrm and Mb1 to Mbn are turned ON, causing floating gates Fr1 to Frm and Fb1 to Fbn each to have an "L" level. Then a shallow potential-well of the regions under the floating gates is formed, with the result being that the signal electric charges are allowed to revert to shift register units 24 and 25. Such transistion of the signal electric charges takes place in a non-destructive manner, and hence the reading of signal electric charges can be repeated many times.

In this way, the signals generated through floating gates Fr1 to Frm and Fb1 to Fbn are converted into time-series signals R(t) and B(t) by the multiplex operations of MOS type FETs Qr1 to Qrm and Qb1 to Qbn, and are outputted to output contacts Pr0 and Pb0, respectively.

Figure 5:
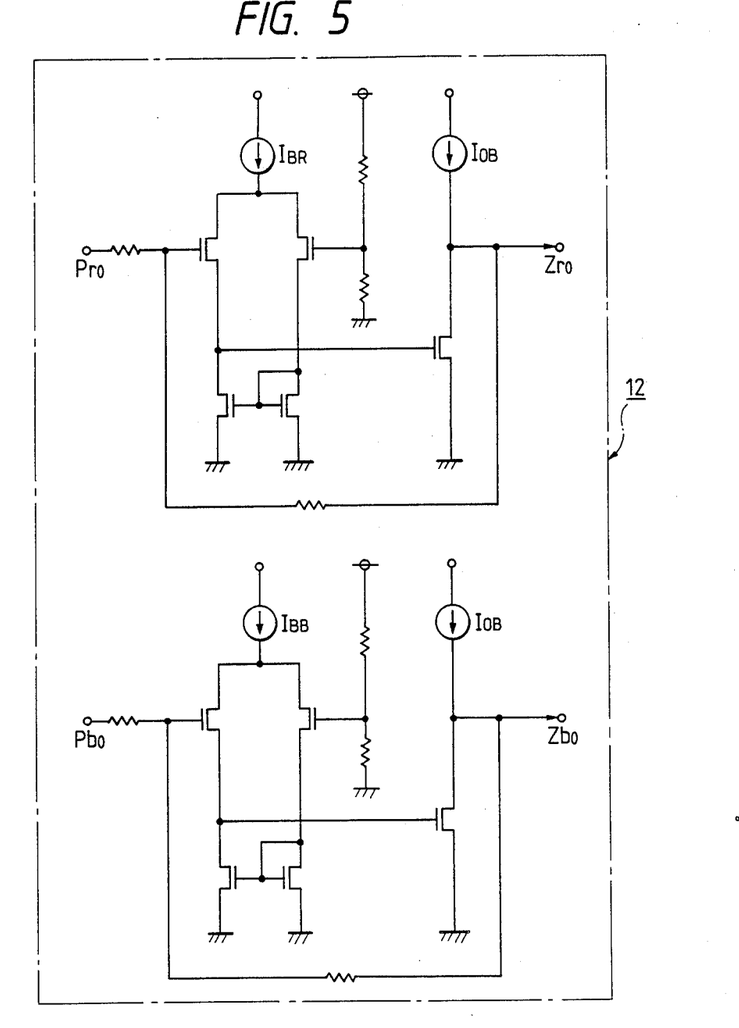
FIG. 5 is a circuit diagram showing a configuration of a variable amplifier.

The configuration of variable amplifier 12 will be discussed in conjunction with FIG. 5. The circuit depicted in the upper part of FIG. 5 works to amplify arithmetic signal R(t), while the other circuit depicted in the lower part of FIG. 5 functions to amplify arithmetic signal B(t). These circuits have the same construction. More specifically, these circuits may be electric power amplifiers for amplifying arithmetic signals R(T) and B(t), the amplification factor of which is made variable by changing the bias current $I_{BR}$ and $I_{BB}$ of a differential amplifier in the first stage in accordance with control signals transmitted from the optimum control means 14. Note that electric currents coming from constant current sources $I_{OR}$ and $I_{OE}$ of an output gate are set to constant values.

Conventional variable gain amplifiers other than those described in this embodiment can also be employed.

Figure 6:
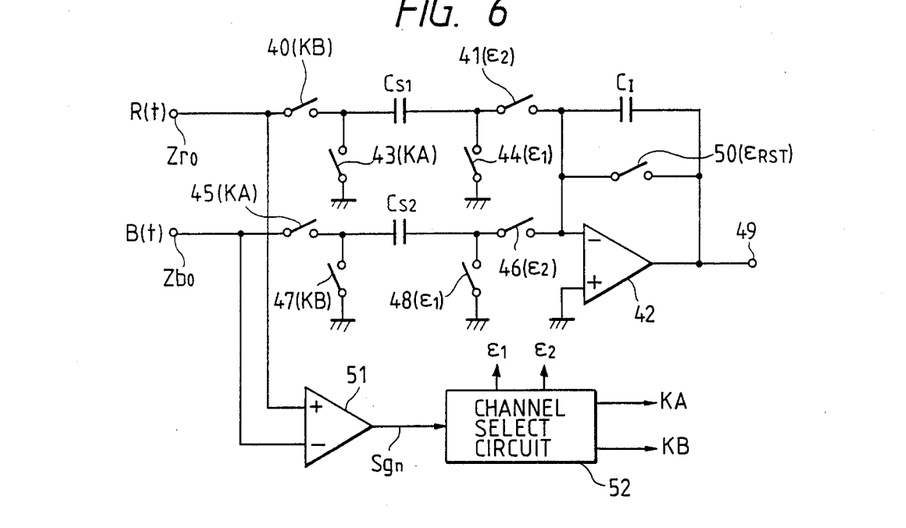
FIG. 6 is a circuit diagram showing a configuration of an analog correlation arithmetic unit.

Referring to FIG. 6, a construction of analog correlation arithmetic unit 13 will be explained.

Arithmetic unit 13 composed of a switched capacitor integrator is arranged such that a signal line extending from an output terminal $Z_{r0}$ (see FIG. 5) is connected to the inversion input terminal of a differential integrator 42 through a switching element 40, a capacitance element $C_{s1}$, and a switching element 41 which are connected in series to each other. Both ends of the capacitance element $C_{s1}$ are connected via switching elements 43 and 44 to a ground terminal. On the other hand, a signal line extending from an output terminal $Z_{b0}$ (see FIG. 5) is connected to the inversion input terminal of differential integrator 42 through a switching element 45, capacitance element $C_{s2}$, and a switching element 46 which are connected in series to each other. Both ends of the capacitance element $C_{s2}$ are connected via switching elements 47 and 48 to the ground terminals. Connected between the inversion input terminal of differential integrator 42 and output terminal 49 are switching element 50 and a capacitance element $C_I$ which are connected in parallel to each other.

Connected to signal lines extending from output terminals $Z_{r0}$ and $Z_{b0}$ is an inversion/non-inversion input terminal of an analog comparator 51. The output terminal of the analog comparator is connected to the input terminal of a channel select circuit 52. The channel select circuit 52 generates select signals $\epsilon_1$, $\epsilon_2$, KA, and KB for controlling "ON" and "OFF" states of switching elements 40, 41, 43, 44, 45, 46, 47, and 48.

Analog comparator 51 outputs a polarity signal Sgn which has an "H" level when the levels of the arithmetic signals are defined such as $R(t) \geq B(t)$, but the polarity signal Sgn has an "L" level when $R(t) < B(t)$. Voltage levels of select signals $\epsilon_1$, $\epsilon_2$, KA, and KB are determined with respect to the level of the polarity signal Sgn.

Figure 7:
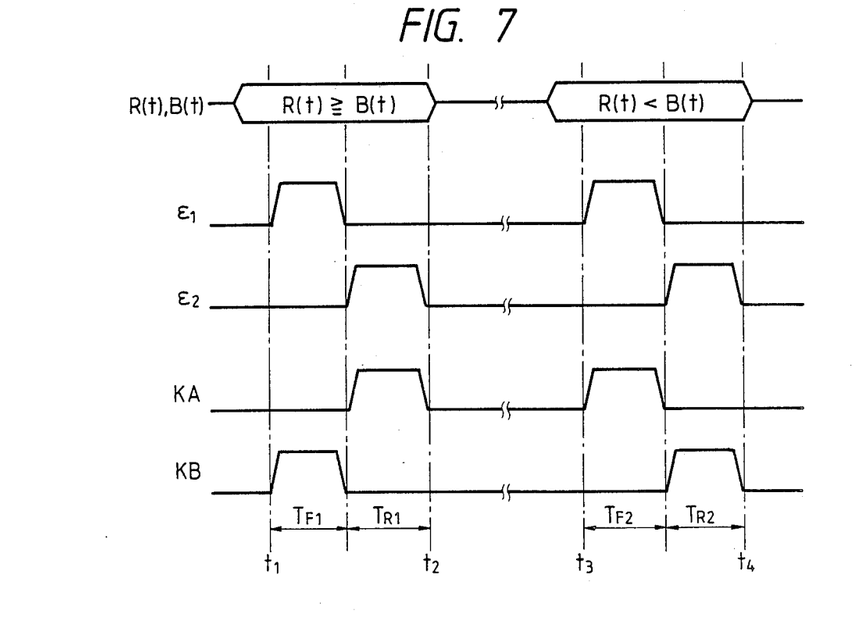
FIG. 7 is a timing chart showing the function with respect to time of the analog correlation arithmetic unit of FIG. 6.

FIG. 7 is a timing chart explaining the function of the analog arithmetic means.

When switching element 51 is turned "ON" in response to a reset signal $\epsilon_{RST}$ transmitted from an unillustrated reset device, unnecessary electric charges of the capacitance element $C_I$ are discharged. Subsequently, switching element 50 is turned "OFF", thus initiating the operation shown in FIG. 7.

It is presumed that arithmetic signals $R(t)$ and $B(t)$ are, as depicted in (A) of FIG. 7, outputted from the variable amplifier 12 at predetermined intervals. Polarity signal Sgn has an "H" level when the arithmetic signals have a relation of $R(t) \geq B(t)$ as is observed during a period ranging from a timing point t1 to a timing point t2, whereby select signals $\epsilon_1$, $\epsilon_2$, KA, and KB each have a rectangular waveform. These signals are illustrated in (B), (C), (D), and (E) of FIG. 7. A group of select signals $\epsilon_1$ and $\epsilon_2$ and another group of select signals KA and KB are generated such that they do not simultaneously have a "H" level. While on the other hand, as is observed during a period ranging from a timing point t3 to a timing point t4, when the arithmetic signals reflect a relation as $R(t) < B(t)$, polarity signal Sgn has a "L" level, whereby select signals KA and KB have phases which are reverse to the phases at the timing points t1 and t2. Note that select signals $\epsilon_1$ and $\epsilon_2$ are generated at the same timing regardless of the level of polarity signal Sgn.

A set of switching elements 44 and 48 and another set of switching elements 40 and 47 and turned "ON" by select signals $\epsilon_1$, $\epsilon_2$, KA, and KB at a first half interval $T_{F1}$ of the period of t1 to t2. In consequence, the capacitance element $C_{s1}$ is charged with arithmetic signal $R(t)$, and the unnecessary electric charges of the capacitance element $C_{s2}$ is thereby discharged. Subsequently at a second half interval $T_{R1}$ of the period of t1 to t2, switching elements 41 and 43 are turned "ON". Therefore, the electric charges of the capacitance element $C_{s1}$ are combined with those of capacitance element $C_I$, an at the same moment switching elements 45 and 46 are turned "ON" and switching elements 47 and 48 are turned "OFF". Arithmetic signal $B(t)$ is supplied via the capacitance element $C_{s2}$ to differential integrator 42. As a result, electric charges $q(t)$ expressed by the formula (2) are accumulated in capacitance element $C_I$.

$$q(t) = \frac{C_I}{C_{s1}} \cdot R(t) - \frac{C_I}{C_{s2}} \cdot B(t) \tag{2}$$

When the arithmetic signals are, as observed during a period of t3 to t4, in terms of $R(t)$ and $B(t)$, a set of switching elements 44 and 48 and another set of switching elements 43 and 45 are turned "ON" at a first half internal $T_{F2}$ of the period of t3 to t4. Then, capacitance element $C_{s2}$ is charged with arithmetic signal $B(t)$, and the unnecessary electric charge of capacitance element $C_{s1}$ is thereby discharged. Subsequently at a second half interval $T_{R2}$ of the period of t3 to t4, switching elements 46 and 47 are turned "ON", and hence the electric charges of capacitance elements $C_{s2}$ and $C_I$ are combined. At the same time a set of switching elements 40 and 41 are turned "ON", and another set of switching elements 43 and 44 are turned "OFF". Arithmetic signal $R(t)$ is then supplied via the capacitance element $C_{s1}$ to differential integrator 42. As a result, electric charges $q(t)$ expressed by the formula (3) are accumulated in capacitor $C_I$.

$$q(t) = \frac{C_I}{C_{s2}} \cdot B(t) - \frac{C_I}{C_{s1}} \cdot R(t) \tag{3}$$

As can be clarified from the foregoing formulas (2) and (3), the arithmetic mean is adapted to invariably accumulate in the capacitance element $C_I$, where electric charges each correspond to a value obtained by subtracting the arithmetic signal of a small level from the arithmetic signal of a greater level. Hence, when repeatedly performing the processing of the time-series arithmetic signals $R(1), \ldots R(n)$ and $B(1), \ldots B(n)$, an absolute value H of a difference between these signals can, as expressed by the formula (4), be obtained as a voltage from output terminal 49.

$$H = \sum_{i=1}^{n} \left| \frac{C_I}{C_{s2}} \cdot R(t) - \frac{C_I}{C_{s1}} \cdot R(t) \right| \tag{4}$$

Figure 3:
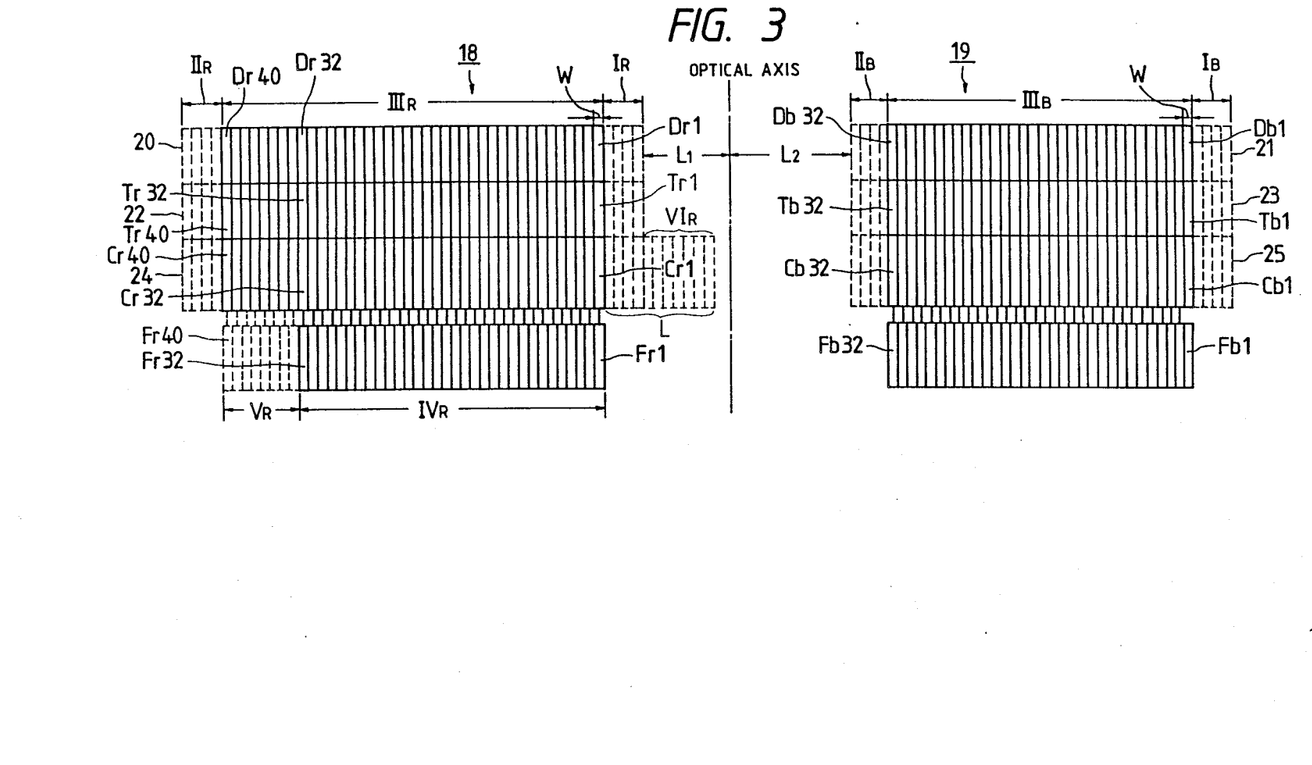
FIG. 3 is a diagram illustrating configurations and arrays of a light receiving unit, an accumulation unit and a shift register unit of the image sensor of FIG. 2.

After completing the arithmetic operation based on the formula (4), first and second signal generating means 18 and 19 depicted in FIG. 3 make a one-pitch transfer of the signal electric charge held by the shift register unit 26 of first signal generating means 18 with respect to the signal electric charge of the other shift register 27. The signal electric charges, which are out of phase with each other, are read out in time-series in preparation of the arithmetic operation pursuant to the formula (4). This arithmetic operation is further repeated after shifting the phases of the signal electric charges of shift register units 26 and 27. An amount of out-of-phase is equivalent to the above-mentioned movement quantity L. The movement quantity L is detected as a voltage from output terminal 49, and its correlative values, when sequentially changing the movement quantity L, can be obtained in the following formula (5):

$$H(L) = \sum_{i=1}^{n} \left| \frac{C_I}{C_{s2}} \cdot B(t) - \frac{C_I}{C_{s1}} \cdot R(t + L - 1) \right| \quad (5)$$

Namely, the formula (5) corresponds to the formula (1). Based on this relation, correlative values H(1), H(2), ... H(L) are obtained by processing the analog signals.

A phase-difference can be detected from patterns of distribution of thee correlative values.

Optimum control means 14 detects the minimum value (or the maximum value) of the respective correlative values H(L) outputted to output terminal 49. Where the variations in correlative values H(L) are reduced to an extent such that it is impossible to detect the minimum value (or the maximum value), the amplification factor of variable amplifier 12 is increased, and optimum control means 14 permits the re-reading of arithmetic signals R(t) and B(t) from shift register units 24 and 25 of image sensors 10 and 11. Simultaneously, optimum control means 14 causes analog correlation arithmetic unit 13 to accomplish the same correlation arithmetic operation as that described above. Before resuming the correlation arithmetic process, the signal electric charges transferred to regions $I_R$ and $VI_R$ of shift register unit 18, depicted in FIG. 3, revert to original region $III_R$ by inverting the phases of driving signals $\phi 1$ to $\phi 4$ on the basis of the shifting process for the correlative computation. Subsequently, the signals are re-read from the shift register units through floating gates Fr1 to Frm. Arithmetic signals R(t) and B(t) employed for the correlation arithmetic process are non-destructively read from shift register units 24 and 25, and hence it follows that the correlation arithmetic operation associated with the same subject pattern is performed with only a difference in amplitude between the arithmetic signals and the non-arithmetic signals used for the previous computation.

As a result of repeating the correlative computation, the minimum value (or the maximum value) of correlative values H(L) can be detected, and a phase-difference is detected on the basis of correlative values H(L) at that time. More specifically, the difference between the phase of the minimum value (or the maximum value) and the phase in the focalization state can be detected, thereby determining the focalization state from this phase-difference.

As discussed above, the detector in this embodiment comprises: the image sensors capable of non-destructive reading arithmetic signals R(t) and B(t) many times which correspond to the patterns of images of the subject; and the analog correlation arithmetic unit for performing the analog correlation arithmetic process on analog arithmetic signals R(t) and B(t) as they are, read from the image sensors. With this arrangement, the correlative values are computed at a higher velocity. The detector further includes the optimum control means for resuming the correlation arithmetic operation by amplifying the amplitudes of the arithmetic signals when the amplitudes of arithmetic signals R(t) and B(t), detected by the image sensors, are undistinguishable, and the characteristics of the signals cannot be obtained from the results of the correlation arithmetic operation. Hence, the minimum value (or the maximum value) of the correlative values becomes apparent, and the accuracy with which the phase-difference is detected an be enhanced.

In this embodiment, the signals are read out several times till the optimum correlative values are obtained by holding in shift register unit 25 the signal electric charges acquired by the signal imaging process. The process is not, however, confined to the above-mentioned one. The computation based on the patterns of new signal electric charges may be executed by repeating the imaging process until the optimum correlative value is obtained. In this case, since a reset process is used in which the preceding signal electric charges (reference unit and basic unit) are discharged each time, the processing time is somewhat delayed. As a matter of fact, however, such a delay does not cause any problem.

Figure 8:
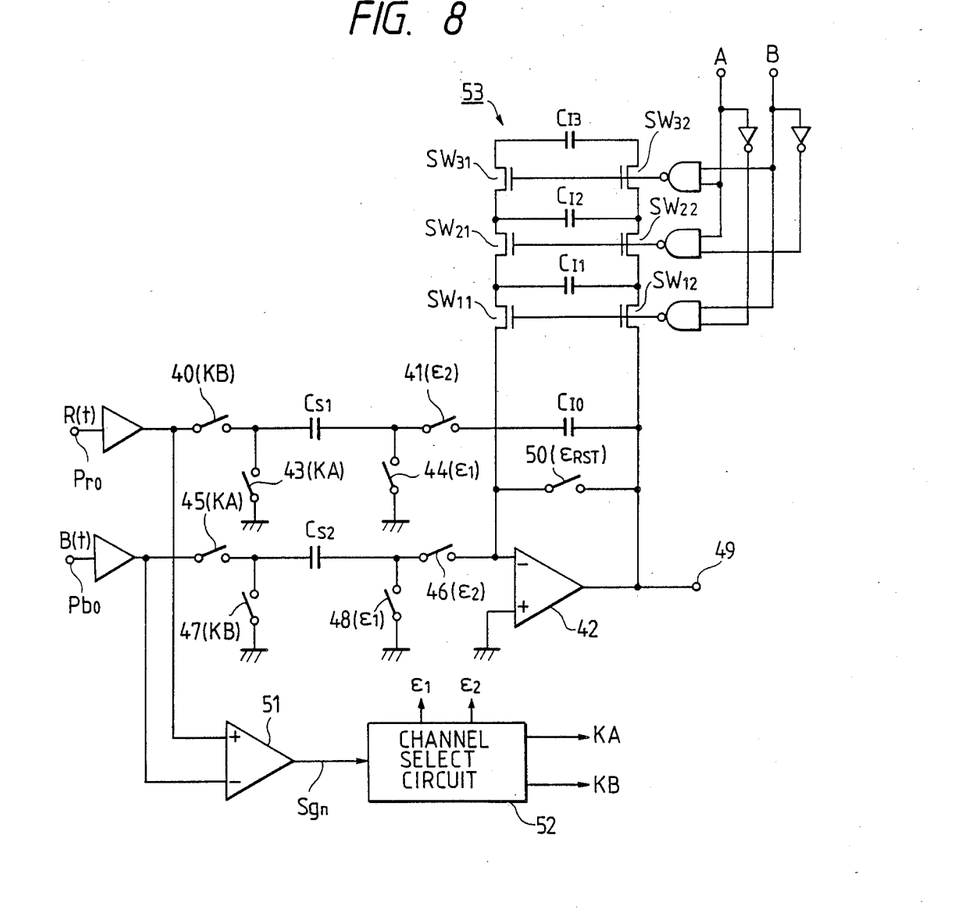
FIG. 8 is a circuit diagram illustrating another embodiment of the analog correlation arithmetic unit.

Turning attention to FIG. 8, there is illustrated another embodiment of a variable gain type analog correlation arithmetic unit conceived as an improved version of the arithmetic unit of FIG. 6. The application of this type of arithmetic unit permits omission of variable amplifier 12 depicted in FIG. 1, whereby arithmetic signals R(t) and B(t) transmitted from image sensors 10 and 11 can directly be computed.

Namely, the analog correlation arithmetic operation is accomplished during the same timing shown in FIG. 7. The different arrangement is such that between the output terminal and inversion input terminal of differential integrator 42 of analog correlation arithmetic unit 13, there is provided a circuit 53 for changing the amplification factor. This circuit includes semiconductor switching elements Sw11, Sw21, and Sw31 connected in series to the inversion input terminal of differential integrator 42, and semiconductor switching elements Sw12, Sw22, and Sw32 connected in series to the output terminal of the differential integrator 42. The semiconductor switching elements are connected so that control signals from a decoder circuit composed of a NAND circuit and an inverter circuit are applied to gate contacts of the switching elements. Connected in parallel between connecting contacts of the semiconductor switching elements, as illustrated in FIG. 8, are capacitance elements $C_{I0}$ to $C_{I3}$, the respective capacitance, of which are set in sequence to 1pF, 1pF, 2pF, and 4pF. The semiconductor switching elements are selectively made conductive in accordance with logical values of code signals A and B transmitted from optimum control means 14. With this arrangement, it is feasible to vary the capacitance between the non-inversion input terminal and the output terminal of integrator amplifier 42. When changing the capacitance in this manner, as is obvious from the formula (5), a value of $C_I$ varies, so that the amplification factor of correlative value H(L) will be changed. Hence, if capacitance $C_I$ is increased by making the semiconductor switching elements conductive, the amplification factor augments, and vice-versa.

Figure 9:
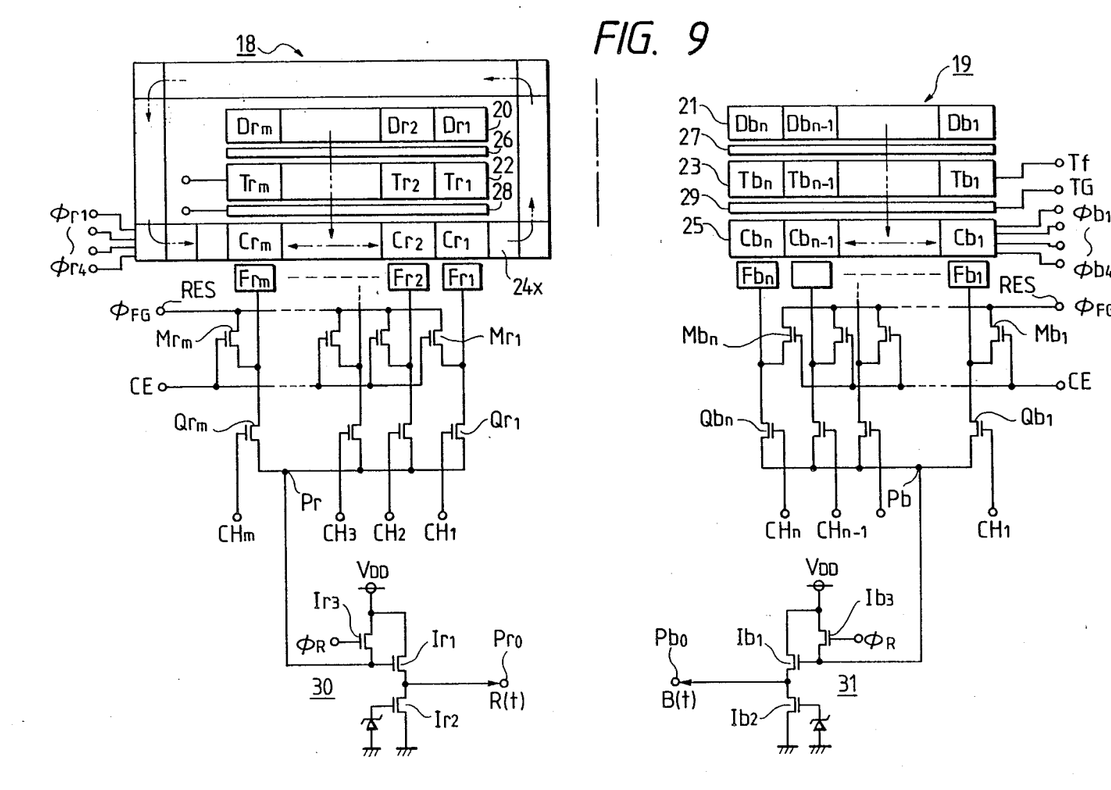
FIG. 9 is a block diagram showing another embodiment of the image sensor.

FIG. 9 illustrates another embodiment of the reference image sensor. In FIG. 9, the like or corresponding components t those depicted in FIG. 2 are marked with the same symbols. The difference in configuration between FIGS. 2 and 9 will be explained as follows. A shift register unit 24x consists of a group of electric charge transfer elements in a annular array. The electric charges of signals which deviate at the time of the previous correlative computation are rearranged in original elements Cr1 to Crm through the above-described annular array before resuming the correlative computation. Consequently, the correlation arithmetic operation may be executed many times till obtaining the optimum correlative value.

As discussed above, the phase-difference detector, according to the present invention, comprises: the sensor means for non-destructively reading the signals associated with a pair of images corresponding to the subject to be photographed which are generated by the respective pixels of the imaging devices; and the analog correlation arithmetic means for analogically computing the correlative values of the non-arithmetic signals outputted from the sensor means. If no distinguishable feature appears in the correlative values computed by the correlation arithmetic means, the correlation arithmetic means is caused to resume the computation by changing the amplification factor of the arithmetic signals. The phase-difference can accurately be detected on the basis of the correlative values under the optimal condition.

The present invention can be varied in many various ways as would be obvious from the foregoing description. Such variations are not regarded as a departure from the spirit and scope of the present invention, and all such modifications are intended to be included within the scope of the following claims.

We claim:

1. A phase-difference detector for determining a focalization state by detecting relative positions of a pair of optical images of a subject, comprising:
    sensor means having pixels, for detecting the pair of optical images and for generating analog signals associated with the pair of optical images formed on said pixels;
    analog correlation arithmetic means, operatively connected to said sensor means, for performing a correlation arithmetic process on said analog signals outputted from said sensor means and for producing correlation values associated with said correlation arithmetic process; and
    optimum control means, operatively connected to said sensor means and said analog correlation arithmetic means, for controlling said analog correlation arithmetic means to reperform said correlation arithmetic process by causing said sensor means to regenerate said analog signals with a new amplification factor when said correlation values computed by said analog correlation arithmetic means do not demonstrate distinguishable features.

2. The phase-difference as claimed in claim 1, wherein said sensor means includes:
    first light receiving means for optically receiving one of said optical images and for photoelectrically converting said one optical image into an electrical charge signal;
    first signal readout means, operatively connected to said first light receiving means for transferring said electric charge signals in a predetermined array-direction, and for parallelly outputting electric signals corresponding to said electric charge signals through floating gates;
    second light receiving means for optically receiving another of said optical images and for photoelectrically converting said another optical image into electrical charge signals; and
    control means, operatively connected to said first and second receiving means, for outputting both an analog electric signal corresponding to said one optical image and an analog electric signal corresponding to said another optical image, said analog electric signals being out of phase with each other;
    said control means sequentially shifting the phases with respect to each other at predetermined intervals.

3. The phase-difference detector as claimed in claim 1, wherein said analog correlation arithmetic means includes:
    a switched capacitor integrator having an integrator, a plurality of capacitance elements and a group of switching elements for connecting and disconnecting said capacitance elements from said integrator;
    said switched capacitor integrator receiving said pair of analog electric signals and detecting a relationship between magnitudes of said analog electric signals;
    said switched capacitor integrator controlling said group of switching elements to switch ON and OFF according to the detected relationship between said magnitudes;
    said switched capacitor generating correlative values of said pair of said analog electric signals by generating electric charges corresponding to an integrated value of an absolute value of a difference in magnitude between said pair of said analog electric signals when said pair of said analog signals are out of phase.

4. A phase-difference detector for determining a focalization state in a camera by detecting relative positions of a pair of optical images corresponding to a subject to be photographed, comprising:
    sensing means, for optically receiving the pair of optical images and for converting the pair of optical images photoelectrically into analog electric signals;
    amplifying means, operatively connected to said sensing means, for amplifying said analog electric signals by a first amplification factor;
    correlation arithmetic means, operatively connected to said amplifying means, for performing a correlative arithmetic process on the amplified analog electric signals to produce correlation values associated with said correlation arithmetic process; and
    optimum control means, operatively connected to said amplifying means and said correlation arithmetic means, for causing said amplifying means to amplify said analog electric signals by a second amplification factor and for causing said correlation arithmetic means to perform said correlation arithmetic process using said analog electric signals amplified by said second amplification factor when said correlation values do not demonstrate distinguishable features.

5. The phase-difference detector as claimed in claim 4, wherein said analog correlation arithmetic means includes:
    a switched capacitor integrator having an integrator, a plurality of capacitance elements and a group of switching elements for connecting and disconnecting said capacitance elements from said integrator;
    said switched capacitor integrator receiving said pair of analog electric signals and detecting a relationship between magnitudes of said analog electric signals;
    said switched capacitor integrator controlling said group of switching elements to switch ON and OFF according to the detected relationship between said magnitudes;

said switched capacitor generating correlative values of said pair of said analog electric signals by generating electric charges corresponding to an integrated value of an absolute value of a difference in magnitude between said pair of said analog electric signals when said pair of said analog signals are out of phase.

6. A method for determining a phase-difference for a focalization state in a camera, comprising the steps of:
 (a) sensing optical images corresponding to a subject to be photographed;
 (b) converting the sensed optical images of said step (a) to analog electric signals;
 (c) amplifying the analog electric signals of said step (b) by a amplification factor;
 (d) performing a correlative arithmetic process upon the amplified analog electric signals of said step (c);
 (e) producing correlative values corresponding to the process performed in said step (d);
 (f) detecting distinguishable difference between the correlatives values, the distinguishable differences representing the focalization state of the camera;
 (g) amplifying the analog electric signals of said step (b) by another amplification factor when said step (f) does not detect distinguishable differences; and
 (h) repeating said steps (d), (e), (f), and (g) when said step (f) does not detect the distinguishable differences.

* * * * *